Patented July 7, 1931

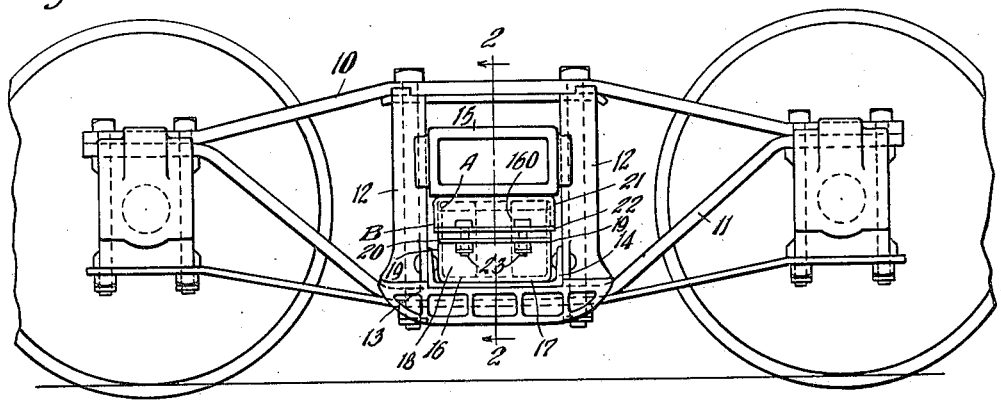

1,813,706

UNITED STATES PATENT OFFICE

GOODRICH Q. LEWIS, OF WHEATON, ILLINOIS, ASSIGNOR TO W. H. MINER, INC., OF CHICAGO, ILLINOIS, A CORPORATION OF DELAWARE

RESILIENT UNIT FOR CAR TRUCKS

Application filed October 23, 1926. Serial No. 143,560.

This invention relates to resilient units for car trucks.

In railway truck construction it is almost the universal practice to utilize spring clusters, comprising a plurality of coiled springs, for disposition between the ends of the truck bolster, and the spring rests of the side frames of railway trucks, to absorb and cushion the shocks between the car bodies and the trucks. Spring clusters, while reasonably efficient, have several objectionable features, among which may be mentioned the expense of manufacture and installation, the relatively large size of the individual units to provide the required resistance, which interferes with the disposition of an adequate number of such units in the limited space available upon a truck; and under service conditions, the spring units are subject to relatively rapid deterioration in efficiency due to weakening and breakage induced by overloading and exposure to the weather.

An object of my invention is to provide cushioning means adapted to be substituted for the spring cluster, by the use of which the objectionable features above referred to are largely eliminated, said cushioning means being made up of a single protected unit which is relatively inexpensive to manufacture and has great efficiency and long life in service.

A more specific object of the invention is to provide a mass of live rubber, in conjunction with means for enclosing the same in such a manner as to maintain the rubber under initial compression in all directions, thereby utilizing an important inherent property of rubber which, when held constantly under some degree of compression, retains its resiliency practically indefinitely, and is not subject to the deterioration which would occur if the same were permitted repeatedly to reach its limit of expansion, or subjected to pounding and chafing from the parts with which it is associated, and in addition it serves to prevent rattling and vibration between such parts and the parts of the container enclosing the same. The container for the rubber is especially designed for efficient use in connection with railway trucks, and comprises elements which permit yielding and limited expansion of the rubber in only one direction, that is vertically, thereby enhancing the resilient properties thereof, the mass of rubber being at all times held under initial compression.

Other and further objects of the invention will more fully and clearly appear from the description and claims hereinafter following.

In the drawings, Figure 1 is a side elevation of a railway truck, showing my invention in connection therewith, and Figure 2 a partial sectional, partial elevational view of the truck side frame, and a fragment of the bolster, substantially on the line 2—2 of Figure 1.

Referring to the drawings, 10 and 11 designate the top and bottom arch members of a common type of truck, while 12—12 denotes the bolster guide columns, 13 a spring plank platform, 14 the spring plank, and 15 a truck bolster. In this connection, although only one side of the truck is illustrated in the drawings, it will be understood, of course, that both sides of the truck are of similar construction, and that my invention contemplates the use of the novel resilient truck unit in connection with both side frames of the truck.

The resilient truck unit contemplated by my invention, broadly comprises a section of live rubber A, or any other resilient material or composition having properties similar to live rubber, in conjunction with a container B which is arranged to maintain the mass of rubber under initial compression.

The block A of live rubber is of such shape and size as to fill the interior of the container B hereinafter described, and be held under initial compression thereby in all directions, said block of rubber being provided with a central recess 160 which preferably extends from the top to the bottom of the block, and is for the purpose of permitting flow of the rubber when the same is compressed to a degree beyond the initial compression thereon.

The container B includes an elongated, boxlike receptacle 16, of a length which may be disposed between the guide columns 12, said receptacle including a bottom wall 17, side walls 18, and end walls 19, the side walls 18 being provided with exterior longitudinally extending flanges 20, as shown, such flanges being preferably disposed approximately midway between the top and bottom of the receptacle, and preferably being formed integrally therewith. The live rubber block or section A, in its original state, is of considerably larger volume than the receptacle 16, and is forced into such receptacle under pressure.

A cap, or cover 21 is provided, which has a slidable telescopic fit with the receptacle 16, the cover being provided with longitudinally extending flanges 22 corresponding with the flanges 20 upon the receptacle 16. Bolts 23 are extended through the flanges 20 and 22, such bolts having nuts threaded thereon so that the cover 21 and the receptacle 16 may be drawn toward each other, to compress the rubber section A to such an extent that the rubber is placed under initial compression, and in the preferred construction, under compression greater than that which would occur due to the imposition of the dead weight of the car on the bolster 15 when the resilient unit is in use. The bolts 23 are arranged to permit sliding movement of the cover 21 with respect to the receptacle 16, so that the unit is rendered resilient to absorb shocks, the downward movement of the cover being limited by the engagement of the top edges of the receptacle with the under surface of the cover, and the expansion of the rubber being limited by the engagement of the bolt heads and the nuts with the outer sides of the flanges 20 and 22 on the cover and receptacle.

In actual use the resilient unit thus composed is placed upon the spring plank 14 at the portion thereof where the same rests upon the spring platform, in such position as to support the end of the bolster 15, and in this connection it may be noted that any suitable means, not shown, may be provided for retaining the resilient unit in position upon the truck platform.

In operation, upon a downward movement of the end of the truck bolster 15, the rubber section A is compressed vertically as permitted by the sliding action between the cap 21 and the receptacle 16 such compression being limited to a vertical plane inasmuch as the sides and ends of the receptacle 16 prevent outward expansion of the rubber, thereby powerfully yieldably resisting the downward movement of the bolster to provide a resilient cushion therefor. When the pressure causing additional weight upon the bolster is relieved, the rubber element A expands, but complete expansion of the rubber element is prevented by reason of the limited movement of the cap, relative to the receptacle as permitted by the retaining bolts, so that the rubber element is constantly held under initial compression.

By this arrangement the effective resiliency of the rubber element is greatly increased, and due to the fact that the rubber is constantly held under compression in all directions, it is protected from abrasion, laceration and excessive displacement in any direction due to pounding between the parts, as well as preventing undesirable vibration.

While I have herein shown and described what I now consider the preferred manner of carrying out my invention, the same is merely illustrative, and I contemplate all changes and modifications that come within the scope of the claims appended hereto.

I claim:

1. In a railway car including a truck provided with a bolster relatively moveable with respect to the truck proper and supporting the car body, the combination with a supporting element fixed with respect to the truck proper; of a cushioning means interposed between the supporting element and bolster, said cushioning means including a mass of live rubber and a telescopic receptacle enclosing said mass, the walls of said receptacle closely fitting the mass of rubber and said mass being provided with an opening to permit flow of the rubber mass during compression; and means connecting the sections of said telescopic receptacle limiting separation of the parts thereof to an extent to constantly hold said rubber mass in partially contracted condition and maintain the same under a predetermined initial compression.

2. In a railway car, including a truck provided with a bolster guided for vertical movement, said bolster supporting the car body, the combination with fixed abutment means on the truck proper; of cushioning means interposed between said abutment means and the bolster and yieldingly resisting relative approach of the bolster and said abutment, said cushioning means including a live rubber block having a central opening to allow deformation and flow of the mass of said block, and a two-part receptacle enclosing said rubber block, the parts of said receptacle being of cup-shaped and telescoped with each other, with the walls thereof closely embracing the rubber block, said cup-shaped parts being movable relatively toward and away from each other; and adjustable means for limiting relative separation of said parts, holding the same assembled and maintaining the rubber block in contracted condition and under an initial compression greater than the dead weight of the car.

3. In a railway car, including a truck provided with a bolster relatively movable vertically with respect to the truck proper and supporting the car body, the combination with a fixed support on the truck proper; of a telescopic casing interposed between said bolster and fixed support, said casing including upper and lower sections, each having continuous side walls and said upper section having a top wall and being open at the bottom, and said lower section having a bottom wall and being open at the top end and having said open end telescoped with the other casing, each of said sections having laterally projecting abutment members thereon at opposite sides thereof, said abutment members of one of said sections being normally spaced from the abutment members on the other section; a rubber block filling said casing, thereby yieldingly supporting said bolster on the truck, said block being completely confined by said casing and having an opening therethrough to permit flow of the rubber mass when compressed; and adjustable connecting means for the sections of said casing, extending through said abutment members of the respective sections and limiting relative separation thereof, to hold said rubber mass at all times partly contracted and under a predetermined compression, said connecting means permitting relative approach of said sections.

In witness that I claim the foregoing I have hereunto subscribed my name this 21st day of October, 1926.

GOODRICH Q. LEWIS.